(12) United States Patent
Van Mourik et al.

(10) Patent No.: US 12,110,728 B2
(45) Date of Patent: Oct. 8, 2024

(54) METHOD AND MOTOR CONTROL SYSTEM FOR USE IN A VEHICLE ROOF ASSEMBLY

(71) Applicant: Inalfa Roof Systems Group B.V., Oostrum (NL)

(72) Inventors: Marco Van Mourik, Ravenstein (NL); Petrus Gerardus Franciscus Bouten, Kessel (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 168 days.

(21) Appl. No.: 17/096,614

(22) Filed: Nov. 12, 2020

(65) Prior Publication Data
US 2021/0148154 A1    May 20, 2021

(30) Foreign Application Priority Data

Nov. 15, 2019   (EP) .................................... 19209387

(51) Int. Cl.
*H02P 6/24*     (2006.01)
*E05F 15/659*   (2015.01)
*H02M 1/32*     (2007.01)

(52) U.S. Cl.
CPC ........ *E05F 15/659* (2015.01); *E05Y 2400/326* (2013.01); *E05Y 2400/508* (2013.01); *E05Y 2900/542* (2013.01)

(58) Field of Classification Search
CPC .............. H02P 21/22; H02P 6/16; H02P 7/28
See application file for complete search history.

(56) References Cited

U.S. PATENT DOCUMENTS

| 6,104,185 A * | 8/2000 | Lamm ...................... G01P 3/487 324/207.2 |
| 6,972,536 B2 | 12/2005 | Mukai et al. |
| 2011/0018528 A1 | 1/2011 | Semineth et al. |
| 2018/0224516 A1 | 8/2018 | Geisler |
| 2020/0067432 A1 * | 2/2020 | Herrada ............... H02K 11/215 |

FOREIGN PATENT DOCUMENTS

| DE | 102009034664 A1 | 1/2011 |
| EP | 3358312 A1 | 8/2018 |

OTHER PUBLICATIONS

European Search Report for European Patent Application No. 119209387.0, dated May 12, 2020.

* cited by examiner

*Primary Examiner* — Kawing Chan
*Assistant Examiner* — Charles S Laughlin
(74) *Attorney, Agent, or Firm* — Steven M. Koehler; Westman, Champlin & Koehler, P.A.

(57) ABSTRACT

A vehicle roof assembly comprises an electronic control circuitry and at least one sensor operatively coupled to the electronic control circuitry. An output of the sensor exhibits hysteresis. A method of operating the vehicle roof assembly comprises performing a sensor power-down sequence. The sensor power-down sequence of steps comprises switching off the sensor; switching on the sensor; detecting the output of the sensor; storing the output of the sensor in a memory; and switching off the sensor. The method prevents inadvertent position drift due to hysteresis effects during a power toggle.

20 Claims, 4 Drawing Sheets

METHOD AND MOTOR CONTROL SYSTEM FOR USE IN A VEHICLE ROOF ASSEMBLY

BACKGROUND

The discussion below is merely provided for general background information and is not intended to be used as an aid in determining the scope of the claimed subject matter.

The invention relates to a method for operating a vehicle roof assembly and a motor control system for use in a vehicle roof assembly.

Motor control systems for use in a vehicle roof and methods for operation thereof are commonly known. For example, the vehicle roof assembly may provide for a glass plate-like closure member that is moveably arranged in the vehicle roof assembly. Such a closure member may be provided over an opening in a vehicle roof. The closure member may be tilted to provide for a tilted position, e.g. suitable for ventilation purposes, wherein a rear side edge portion of the closure member is tilted out of a plane of the vehicle roof. From the tilted position, the closure member may be slid over another part of the vehicle roof, uncovering the opening in the roof.

In another known vehicle roof assembly, a fixed transparent closure member such as a glass panel may be provided with a moveable sunshade member, e.g. a flexible screen or a plate, for allowing or preventing exterior light such as sun light to enter a passenger interior compartment of the vehicle through the glass panel. It is noted that such a moveable sunshade screen or plate is also known in combination with the moveable closure member.

In the known vehicle roof assemblies, the moveable part may be driven by a drive assembly, wherein the drive assembly comprises a motor and electronic control circuitry for controlling the motor. Further, the drive assembly may comprise a mechanical coupling between the motor and the moveable part, i.e. the closure member and/or the sunshade member such that the motor is enabled and configured to move the moveable part.

In order to control the motor and a corresponding position and speed of the moveable part, it is known to arrange two magnetic sensors, like two Hall sensors, adjacent to the motor such that the magnetic sensors are arranged relative to the motor such that they are able to detect a rotation of a magnetic motor part. The electronic control circuitry is operatively coupled to the magnetic sensor and is configured to detect a speed of rotation of the motor and a number of rotations. Based on the number of rotations and a predetermined ratio between the motor rotation and a movement distance of the moveable part, the control circuitry is enabled to derive an amount of movement of the moveable part and a position of the moveable part.

The magnetic sensors, in particular the Hall sensors, may advantageously have a hysteresis to prevent a bouncing signal, e.g. when the motor stops with the magnetic part in a detecting range of one of the magnetic sensors. The hysteresis provides for a range in which an output of the magnetic sensor may have one of two values, wherein in particular one value depends on e.g. a preceding direction of rotation. However, when starting the motor control system there is no preceding rotation known to the magnetic sensors and the output is unreliable as it may have changed compared to the output at the moment of switching off the motor control system, even if the moveable part has not moved in the meantime.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect, a vehicle roof assembly includes an electronic control circuitry and at least one sensor operatively coupled to the electronic control circuitry and an output of the sensor exhibits hysteresis. Upon power down of the electronic control circuitry, the electronic control circuitry is configured to perform a sensor power-down sequence of steps. The sensor power-down sequence comprises switching off the sensor; switching on the sensor; detecting the output of the sensor; storing the output of the sensor in a memory; and switching off the sensor.

As above described, the hysteresis of the output of the sensor is dependent on a previous state. Since the sensor does not have a known history on power up, the steps performed in the order as above described, start by resetting the sensor. The sensor is reset, i.e. its history is removed, by switching off the sensor and switching the sensor on again. The electronic control circuitry in the meantime remains on and does not change any state related to the sensor output.

After the reset by the power toggle, the sensor output is detected by the electronic control circuit. The sensor output may be the same or may be different compared to the output prior to the power toggle, which output depends on the hysteresis. Still, provided that the related state of the vehicle roof assembly is not changed, this sensor output after power toggle is reliable and is not dependent on hysteresis, since no historic state is available. Hence, the sensor output that will be detected after powering up the electronic control circuit later will correspond to the sensor output that is detected after power toggle.

At this stage, the electronic control circuit has not changed the related state and the sensor output after power toggle, either the same or different than before power toggle, may be stored in a memory and be thus be stored in combination with as the state of the vehicle roof assembly upon powering down of the electronic control circuit. Then, the sensor may be switched off and the electronic control circuit may be powered down.

It is noted that the sensor may be powered down or switched off by the electronic control circuit even when the electronic control circuit is not powering down itself. For example, the electronic control circuit may be configured to have a low power mode, wherein the sensor may be powered down, reducing power usage, when the state of the vehicle roof assembly related to the sensor is not changing e.g. when the vehicle roof assembly is not operated.

In an embodiment, the vehicle roof assembly comprises a moveable part and the electronic control circuitry is comprised in a drive assembly for moving the moveable part. In particular, the drive assembly may comprise an electric motor and the sensor is a magnetic sensor for detecting a rotation of a rotor of the electric motor. For example, the magnetic sensor may be a Hall sensor. As above described, it is known that a vehicle roof assembly comprises a moveable part like a moveably arranged glass closure member and/or a moveable sunshade member, like a sunscreen. Such moveable parts may be electrically operable, wherein an electric motor is provided in a drive assembly for moving such moveable part. The electric motor commonly has a rotor having magnetic poles allowing a magnetic sensor like a Hall sensor to detect rotation of such a rotor. Based on the detected rotation, a position of the moveable part is derived. In order to prevent uncontrolled bouncing of an output of the magnetic sensor, the magnetic sensor is usually provided with a hysteresis. Still, as above described, a power toggle of the magnetic sensor may result in a different output. As a consequence, the derived position may be affected without actually having changed resulting in position drift, i.e. a difference in the actual position of the moveable part and the derived position as used by the electronic control circuitry. Hence, in this embodiment, the position drift is prevented or at least reduced, thereby diminishing the need for recalibration of the position of the moveable part.

Further, in a preferred embodiment, the electronic circuitry is further configured to perform a sensor power-up sequence comprising switching on the sensor; detecting the output of the sensor; comparing the output of the sensor with the output stored in the memory; and determining occurrence of a change if the output of the sensor and the output stored in the memory are different. For example, the sensor power-up sequence may be performed upon power up of the electronic control circuitry. Thus, the output state of the sensor stored during a power down of the sensor is compared to an output state of the sensor during power up of the sensor. Any deviation between the power down state and the power up state may be regarded as an undefined change in the related state of the vehicle roof assembly, e.g. a position of a moveable part. Such an undefined change in the related state is of course undesirable and may be used as a trigger for initiating a calibration sequence, for example.

In an aspect, the present invention further provides for a method of operating a vehicle roof assembly, the vehicle roof assembly comprising an electronic control circuitry and at least one sensor operatively coupled to the electronic control circuitry, an output of the sensor exhibiting hysteresis, wherein the method comprises performing a sensor power-down sequence comprising switching off the sensor; switching on the sensor; detecting the output of the sensor; storing the output of the sensor in a memory; and switching off the sensor.

In an embodiment, the method further comprises performing a sensor power-up sequence of steps comprising switching on the sensor; detecting the output of the sensor; comparing the output of the sensor with the output stored in the memory; and determining occurrence of a change if the output of the sensor and the output stored in the memory are different. In a particular embodiment, upon determination of the change, the sensor power-up sequence of steps comprises a subsequent step of determining a related state of the vehicle roof assembly. For example, the actual position of a moveable part may be determined to match the derived position as used in the electronic control circuitry with the actual position.

In a further aspect, the present invention further provides a computer software product comprising computer readable and executable instructions for instructing a computer processor to perform the method steps according to one of the above described methods according to the present invention, wherein said computer processor is comprised in said electronic control circuitry.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art.

DETAILED DESCRIPTION OF THE ILLUSTRATIVE EMBODIMENTS

The present invention will now be described with reference to the accompanying drawings, wherein the same reference numerals have been used to identify the same or similar elements throughout the several views.

Figure 1A:
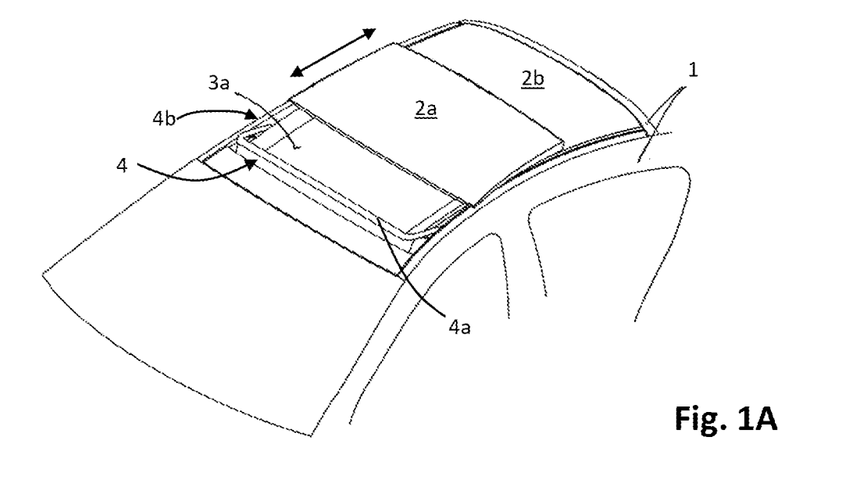
FIG. 1A shows a perspective view of a vehicle roof with an open roof assembly.

FIG. 1A illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end (RE) of the moveable panel 2a is raised as compared to the closed position, while a front end (FE) of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
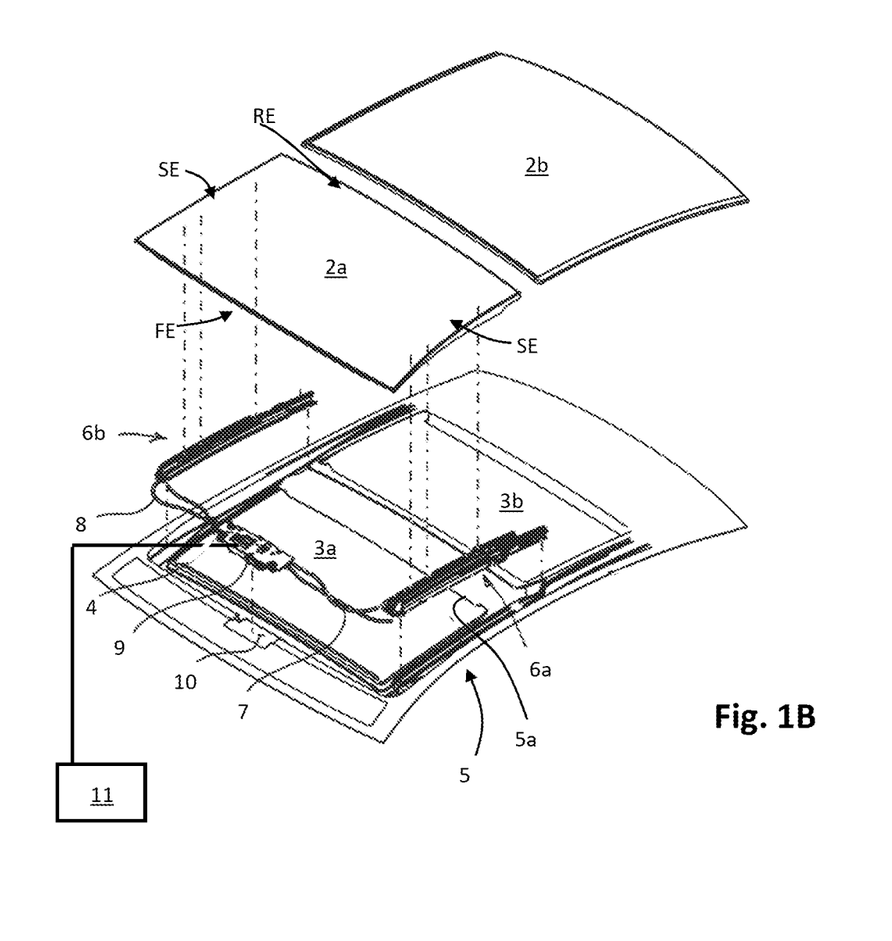
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end (FE) of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, a drive motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end (RE) of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end (RE), while an open position is reached by first lowering the rear end (RE) and then sliding the moveable panel 2a under the fixed panel 2b or any other structure or element provided behind the rear end (RE) of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end (FE) of the moveable panel 2a at a recess 10. In another embodiment, the drive motor 9 may be positioned at any other suitable position or location. For example, the drive motor 9 may be arranged near or below the rear end (RE) of the moveable panel 2a or below the fixed panel 2b.

A control unit 11 is schematically illustrated and is operatively coupled to the drive motor 9. The control unit 11 may be any kind of processing unit, either a software controlled processing unit or a dedicated processing unit, like an ASIC, which are both well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

Figure 2A:
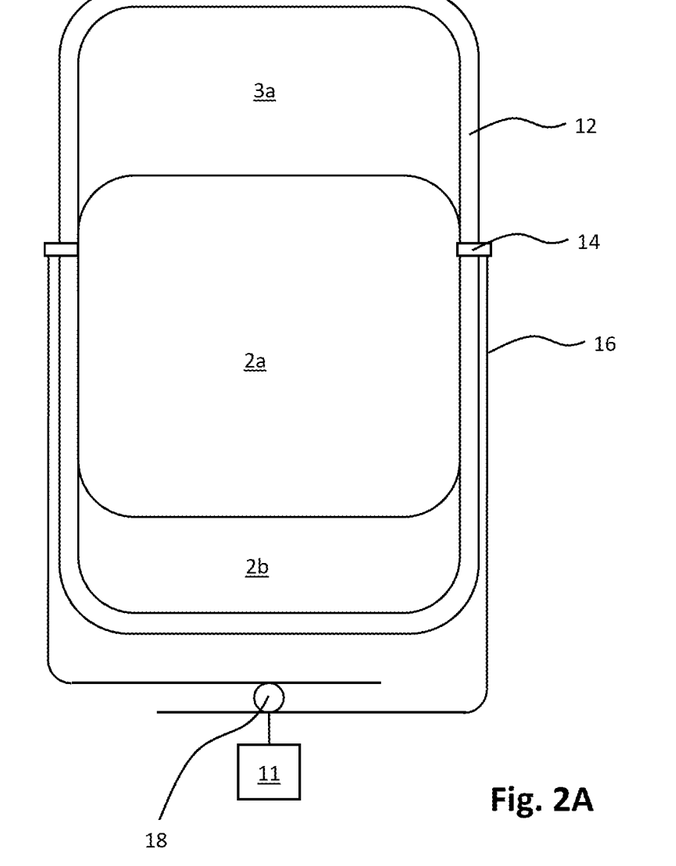
FIG. 2A shows a top view of an embodiment of a vehicle roof assembly with a moveable closing member and a corresponding drive assembly.

FIG. 2A schematically illustrates a moveable roof assembly with a drive assembly. The moveable roof assembly comprises the moveable closure member 2a for closing the first roof opening 3a, the fixed panel 2b and a support frame 12. The support frame 12 is arranged and configured to mount and support the moveable roof assembly on a body frame of a vehicle. In FIG. 2A, the moveable closure member 2a is schematically coupled to a drive cable 16 through a coupling element 14. In practice and as illustrated in FIG. 1A and 1B, the moveable closure member 2a is arranged on the support frame 12 through the guide assemblies 6a, 6b and each guide assembly 6a, 6b is operated through an associated drive cable 16. In the illustrated embodiment, the drive cable 16 is moveable through an operative, mechanical coupling to a suitable gear wheel 18.

Figure 2B:
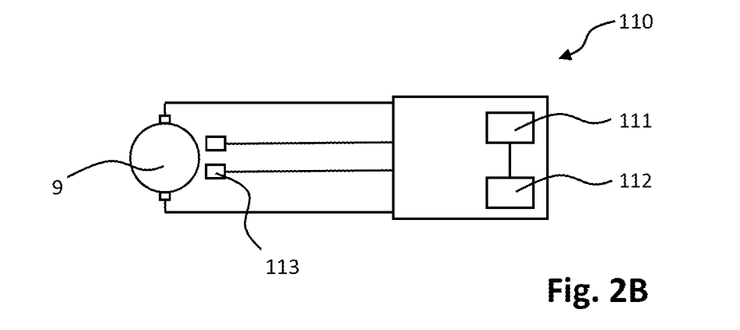
FIG. 2B shows a schematic diagram of an embodiment of an electronic control circuitry.

Referring to FIGS. 2A and 2B, the gear wheel 18 is mechanically coupled to the drive motor 9, which is operatively coupled to the control unit 11. The control unit 11 comprises electronic control circuitry 110. In accordance with the present invention, the electronic control circuitry 110 is coupled to a sensor 113, in particular a magnetic sensor, which is commonly a Hall sensor in this application. The sensor 113 is arranged next to the motor device 9, which in this embodiment is an electric motor having a rotor with magnetic poles. When the motor device 9 is energized, the rotor rotates and the magnetic poles pass along the sensor 113. Thus, a pulse signal is generated and the rotation of the motor device 9 is detectable.

The rotation, in particular an amount of rotation and a speed of rotation, may be derived by analysis of the pulse signal. A direction of the rotation may be detected by application of two Hall sensors 113. A phase shift between a first and a second pulse signal can be used to detect the direction of rotation.

For the analysis of the pulse signal, the electronic control circuitry 110 may comprise a computer processor 111, which may be software controlled processor or may be hardware processor, like an ASIC. The electronic control circuitry 110 may further comprise a memory device for storing software instructions for controlling the operation of a software controlled processor. The memory device 112 may further be used for storing parameters of the vehicle roof assembly, e.g. needed for control of movement of the moveable closure member 2a, e.g. for reliable and timely detection of an object entrapment between the moveable closure member 2a and the frame 12.

The rotation of the motor device 9 is directly linked to a displacement of the moveable closure member 2a and thus to a position of the moveable closure member 2a. Therefore, it is well known to use a Hall sensor 113 next to the motor device 9 to monitor and control a position of the moveable closure member 2a.

Figure 3:
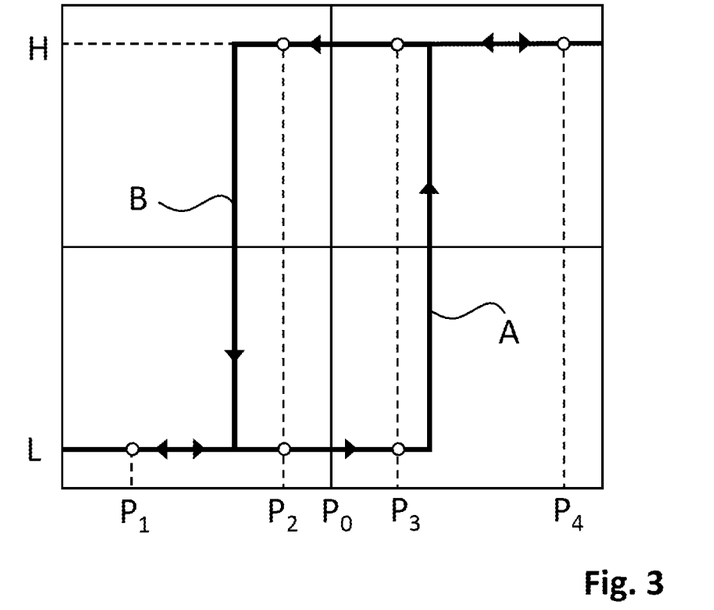
FIG. 3 shows a graph of a sensor output exhibiting hysteresis.

In order to prevent undesired bouncing of the pulse signal output by the sensor 113, the sensor 113 may be provided with a hysteresis property. Hysteresis is elucidated with reference to FIG. 3. As well known to the skilled person, a sensor output like the pulse signal and exhibiting hysteresis is an output that is dependent on a history. FIG. 3 shows a sensor output signal with branches A, B and having two possible output values high H and low L as indicated on the vertical axis. The horizontal axis represents a position of a magnetic pole on the rotor of a motor device 9.

At a switch position $P_0$, the magnetic pole is at the position where the sensor output signal would switch its value between high H and low L, if there would be no hysteresis. Inevitably, if the magnetic pole would be stationary at the switch position $P_0$, the output signal might start bouncing between high H and low L, e.g. due to a minor vibration of the magnetic pole.

To prevent such bouncing, hysteresis has been introduced. For example, the magnetic pole may be moving from a first position $P_1$ towards a fourth position $P_4$ thereby passing the switch position $P_0$. As indicated by the arrows, along the trajectory from the first position $P_1$ to the fourth position $P_4$, the output signal will follow the magnetic pole along a first branch A, remaining at low L beyond a second position $P_2$, the switch position $P_0$ and a third position $P_3$. So, despite passing the switch position $P_0$, the sensor output remains at low L. Only beyond the third position $P_3$, the sensor output switches to high H to arrive at the fourth position $P_4$ with a high value H. Thus, when travelling from the first position P1 to the fourth position $P_4$, the sensor output value is low L at the second, the switch and the third position $P_2$, $P_0$, $P_3$.

When the magnetic pole travels in opposite direction, i.e. from the fourth position $P_4$ to the first position $P_1$, the sensor output signal goes along a second branch B, meaning that the sensor output value starts at a high value H and along the trajectory along the third position $P_3$, the switch position $P_0$ and the second position $P_2$, the sensor output value remains high H. Only between the second position $P_2$ and the first position $P_1$, the sensor output drops to low L. Hence, depending on the direction of travel, the sensor output value is either high H or low L at the second position $P_2$, the switch position $P_0$ and the third position $P_3$. The properties of hysteresis and how it prevents undesired bouncing is believed to be known to the skilled person and is therefore not further elucidated.

As above described, the sensor output value at the third position $P_3$, for example, depends on the origin of the magnetic pole. For example, if the magnetic pole came from the first position $P_1$, the sensor output value will be low L. However, if the sensor 113 is switched on, when it is arranged at the third position $P_3$, the history is unknown and, in view of the third position $P_3$ relative to the switch position $P_0$, it may be assumed that without a known history the sensor output value will initially be high H.

Referring to FIGS. 2A, 2B and 3, when switching off the sensor 113 when the magnetic pole is at the third position $P_3$ and the sensor output is low L, the position of the moveable closure member 2a is determined and registered by the electronic control circuitry 110 relative to the sensor output value being low L. When restarting the electronic control circuitry 110 and the sensor 113, the sensor output value will be high H as above explained. So, a deviation of the sensor output value between power down and power up results, leading to position drift, i.e. a deviation between the position assumed by the electronic control circuitry and the actual position of the moveable closure member 2a.

Figure 4:
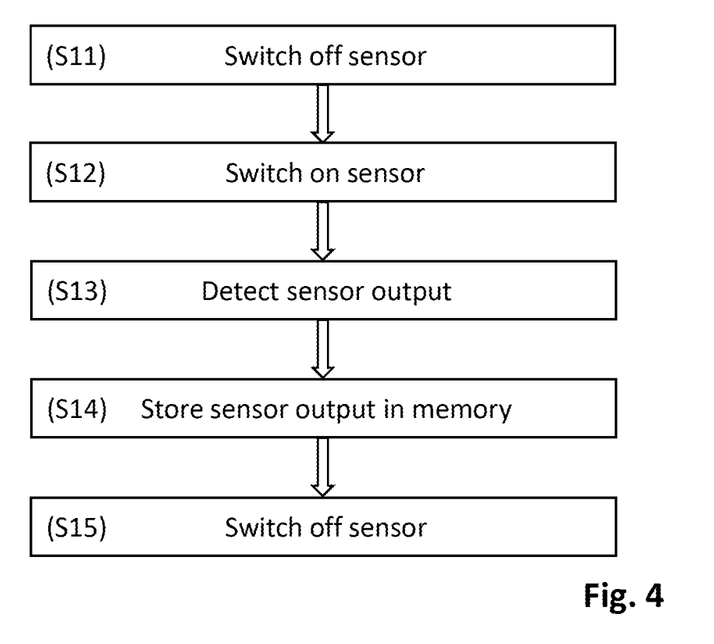
FIG. 4 shows a flow diagram illustrating an embodiment of a sensor power-down sequence.

FIG. 4 illustrates a power down sequence in accordance with the present invention to prevent the position drift due to the hysteresis in the output of the sensor 113. Essentially, prior to finally switching off, the sensor output value upon power up is first determined and stored in a suitable memory. Thereto, first the sensor 113 is switched off at a first step S11 and is switched back on in a second step S12. After the power toggle of the first and second steps S11, S12, the sensor output value will be identical to the sensor output value when the sensor is switch on later. So, after the power toggle, the sensor output value is detected in a third step S13, which may be the same or opposite to the sensor output value prior to the power toggle.

The detected sensor output value is stored as the last value before power down and is thus related to the position of the closure member 2a upon power down. Then, as a fifth and last step S15, the sensor is finally switched off and powered down.

The power down sequence as illustrated in FIG. 4 may be performed when the vehicle is powered down, but there may be other reasons to switch off the sensor 113, the electronic control circuitry 110 or the control unit 11. For example, for low power consumption, not used parts like the control unit 11, the electronic control circuitry 110 or only the sensor 113 may be switched off, e.g. when the moveable closure member 2a is not being operated.

Figure 5:
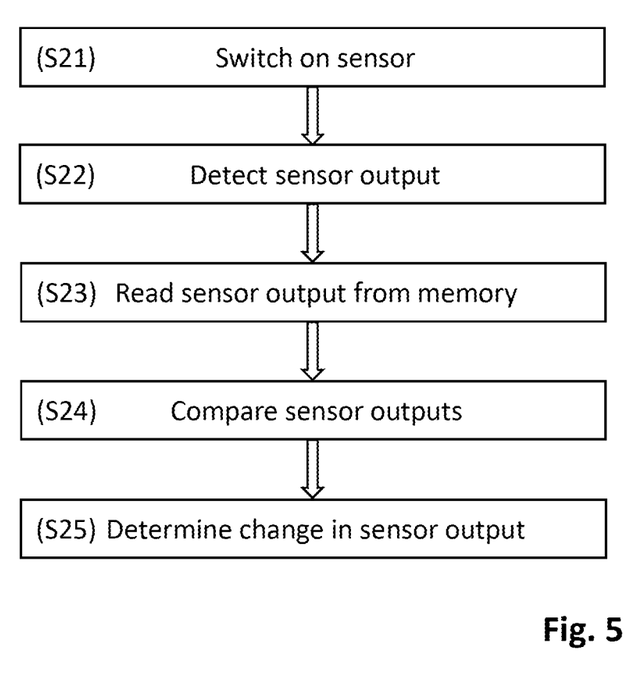
FIG. 5 shows a flow diagram illustrating an embodiment of a sensor power-up sequence.

When switching the sensor 113 on, a power-up sequence as illustrated in FIG. 5 may be performed. In the power-up sequence, after switching on the sensor 113 in a first step S21, an actual sensor output is detected in a second step S22. Prior to, at the same time as or after the second step S22, a third step S23 is performed, wherein the sensor output as stored in memory is retrieved from memory. Assuming the closure member 2a has not moved in the time between switching off and switching on the sensor 113, both sensor outputs as derived in the second and the third step S22, S23 should be the same. Therefore, in a fourth step S24, both sensor outputs are compared and in a fifth step S25, based on the outcome of the fourth step S24, it is determined whether a change has occurred.

If a change is detected, further sequence steps may be initiated. For example, a recalibration of the position of the closure member 2a may be initiated, a fault signal may be given to an operator, one or more functions may be disabled, or any other suitable or necessary measure may be activated. Such a measure may be related to safety of persons or may be intended to prevent damage to the vehicle roof assembly, for example.

Hereinabove, the present invention is described in relation to an example of a Hall sensor measuring a position of a magnetic pole of a rotor of a motor device. It is noted that the method and sequences of the present invention may be equally well be employed in combination with any other sensor exhibiting hysteresis.

Further, it is noted that the methods and sequences of the present invention as illustrated in and described in relation to FIGS. 4 and 5 may be embedded in the electronic control circuitry 110 of the embodiment of FIGS. 2A and 2B. Such embedding may be in software or in hardware or in any other suitable form. In this respect, it is noted as well that the present invention may be embodied in a computer readable format on a computer readable medium, wherein computer readable and executable instructions are provided to instruct a computer processor cf. processor 111 to perform a method or sequence in accordance with the present invention.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A vehicle roof assembly comprising an electronic control circuitry having memory and a sensor having a power up state and a power down state and being operatively coupled to the electronic control circuitry, an output of the sensor exhibiting and being dependent on hysteresis,
wherein the electronic control circuitry is configured to perform, to power down the sensor, a sensor power-down sequence from the power up state to the power down state comprising:
switching off the sensor to power down; and
prior to the switching off of the sensor:
resetting the sensor by a power toggle of the sensor to output a hysteresis independent output:
detecting the hysteresis independent output of the sensor; and
storing the hysteresis independent output of the sensor in the memory for comparison with a later hysteresis independent output of the sensor, detected upon again powering up the sensor after having been switched off, to determine whether a state of the vehicle roof assembly has changed between storing the hysteresis independent output and the later hysteresis independent output.

2. The vehicle roof assembly according to claim 1 and further comprising a moveable part and the electronic control circuitry comprises a drive assembly coupled to the moveable part.

3. The vehicle roof assembly according to claim 2, wherein the drive assembly comprises an electric motor and the sensor is a magnetic sensor configured to detect a rotation of a rotor of the electric motor.

4. The vehicle roof assembly according to claim 3, wherein the magnetic sensor is a Hall sensor.

5. The vehicle roof assembly according to claim 2, wherein the moveable part is one of a closure member and a sunshade member.

6. The vehicle roof assembly according to claim 1, wherein the electronic control circuity is configured to perform the sensor power-down sequence upon powering down of the electronic control circuitry.

7. The vehicle roof assembly according to claim 1, wherein the electronic circuitry is configured to perform a sensor power-up sequence comprising:
switching on the sensor;
detecting the output of the sensor;
comparing the output of the sensor with the output stored in the memory; and
determining occurrence of a change based on the output of the sensor and the output stored in the memory being different.

8. The vehicle roof assembly according to claim 7, wherein the electronic control circuity is configured to perform the sensor power-up sequence upon powering up of the electronic control circuitry.

9. A method of operating a vehicle roof assembly, the vehicle roof assembly comprising an electronic control circuitry and a sensor having a power up state and a power down state and being operatively coupled to the electronic control circuitry, an output of the sensor exhibiting and being dependent on hysteresis,
wherein the method comprises performing, to power down the sensor, a sensor power-down sequence from the power up state of the sensor into the power down state of the sensor comprising:
switching off the sensor to power down; and
prior to the switching off of the sensor:
resetting the sensor by a power toggle of the sensor to output a hysteresis independent output:
detecting the hysteresis independent output of the sensor; and
storing the hysteresis independent output of the sensor in a memory for comparison with a later hysteresis independent output of the sensor, detected upon again owering up the sensor after having been switched off, to determine whether a state of the vehicle roof assembly has changed between storing the hysteresis independent output and the later hysteresis independent output.

10. The method according to claim 9, and further comprising performing a sensor power-up sequence comprising:
switching on the sensor;
detecting the output of the sensor;
comparing the output of the sensor with the output stored in the memory; and
determining occurrence of a change based on the output of the sensor and the output stored in the memory being different.

11. The method according to claim 10, wherein, upon determination of the change, the sensor power-up sequence of steps comprises a subsequent step of determining a state of the vehicle roof assembly.

12. A computer software product comprising computer readable and executable instructions for instructing a computer processor to perform a method of operating a vehicle roof assembly, the vehicle roof assembly comprising an electronic control circuitry and a sensor having a power up state and a power down state and being operatively coupled to the electronic control circuitry, an output of the sensor exhibiting and being dependent on hysteresis, the instructions performing, to power down the sensor, a sensor power-down sequence from the power up state to the power down state comprising:

switching off the sensor to power down; and
prior to the switching off of the sensor:
resetting the sensor by a power toggle of the sensor to output a hysteresis independent output:
detecting the hysteresis independent output of the sensor; and
storing the hysteresis independent output of the sensor in a memory for comparison with a later hysteresis independent output of the sensor, detected upon again powering up the sensor afte having been switched off, to determine whether a state of the vehicle roof assembly has changed between storing the hysteresis independent output and the later hysteresis independent output.

13. The computer software product according to claim 12, wherein the instructions perform a sensor power-up sequence comprising:

switching on the sensor;
detecting the output of the sensor;
comparing the output of the sensor with the output stored in the memory; and
determining occurrence of a change based on the output of the sensor and the output stored in the memory being different.

14. The computer software product according to claim 13, wherein, upon determination of the change, the sensor power-up sequence of steps comprises a subsequent step of determining a state of the vehicle roof assembly.

15. The computer software product according to claim 13 wherein the sensor has a power up state and a power down state and the sensor power-down sequence is from the power up state of the sensor into the power down state of the sensor, and wherein the instructions for performing the sensor power-down sequence comprise switching off the sensor and switching on the sensor by toggling power to the sensor in the power up state, and
wherein detecting the output of the sensor and storing the detected output of the sensor in the memory occurs after toggling the power, and
wherein switching off the sensor occurs after detecting the output of the sensor and changes the state of the sensor from the power up state into the power down state.

16. The method of claim 9 wherein the sensor has a power up state and a power down state and the sensor power-down sequence is from the power up state of the sensor into the power down state of the sensor, and wherein performing the sensor power-down sequence comprises switching off the sensor and switching on the sensor by toggling power to the sensor in the power up state, and
wherein detecting the output of the sensor and storing the detected output of the sensor in the memory occurs after toggling the power, and
wherein switching off the sensor occurs after detecting the output of the sensor and changes the state of the sensor from the power up state into the power down state.

17. The vehicle roof assembly of claim 1 wherein the sensor has a power up state and a power down state and the sensor power-down sequence is from the power up state of the sensor into the power down state of the sensor, and wherein the electronic control circuitry is configured to perform the sensor power-down sequence by switching off the sensor and switching on the sensor by toggling power to the sensor in the power up state, and
detect the output of the sensor and storing the detected output of the sensor in the memory after toggling the power, and
switch off the sensor after detecting the output of the sensor to change the state of the sensor from the power up state into the power down state.

18. The vehicle roof assembly according to claim 1, wherein at least during the resetting the sensor by power toggle of the sensor and the detecting the output of the sensor a state related to the sensor output is not changed.

19. The method according to claim 9, wherein at least during the resetting the sensor by power toggle of the sensor and the detecting the output of the sensor a state related to the sensor output is not changed.

20. The computer software product according to claim 12, wherein at least during the resetting the sensor by power toggle of the sensor and the detecting the output of the sensor a state related to the sensor output is not changed.

* * * * *